(12) United States Patent
Yanagimoto (10) Patent No.: US 7,034,489 B2
(45) Date of Patent: Apr. 25, 2006

(54) POSITIONING APPARATUS AND CONTROLLING APPARATUS

(75) Inventor: Yoshiyuki Yanagimoto, Hyogo (JP)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/909,688

(22) Filed: Aug. 2, 2004

(65) Prior Publication Data

US 2005/0035735 A1    Feb. 17, 2005

(30) Foreign Application Priority Data

Aug. 14, 2003    (JP)    ............................ 2003-293536

(51) Int. Cl.
*G11B 5/455*    (2006.01)
(52) U.S. Cl. ..................... 318/565; 360/70; 369/53.1
(58) Field of Classification Search ............... 318/560, 318/565, 652; 360/69, 70, 75; 369/43, 53.1
See application file for complete search history.

(56) References Cited

U.S. PATENT DOCUMENTS 4,536,809 A * 8/1985 Sidman .................... 360/77.04
5,550,685 A * 8/1996 Drouin ..................... 360/77.08
2003/0227707 A1* 12/2003 Kokami et al. ............... 360/75

FOREIGN PATENT DOCUMENTS

JP        2000-187821        7/2000
WO       WO 01/39183        5/2001

* cited by examiner

*Primary Examiner*—Bentsu Ro (57) ABSTRACT

A rotational positioning apparatus that comprises an apparatus for moving a head or disk and that positions the head relative to the disk, with this rotational positioning apparatus capable of both static positioning and dynamic positioning, also comprises a processor for generating one positioning command to be input to a movement apparatus from two positioning commands.

5 Claims, 6 Drawing Sheets

POSITIONING APPARATUS AND CONTROLLING APPARATUS

FIELD OF THE INVENTION

The present invention pertains to a positioning apparatus for relative positioning of a head and a disk and in particular, relates to a space-saving positioning apparatus with which high-speed positioning is possible.

DISCUSSION OF THE BACKGROUND ART

A head/disk testing apparatus is an apparatus for testing a head or disk used in a hard disk drive. Head/disk testing apparatuses comprise a spin stand, an electric measurement part, and a control part for controlling the spin stand and the electric measurement part. The spin stand comprises a disk rotating apparatus for rotating the disk and a positioning apparatus for relative positioning of the disk and the head.

It is specified that the head is positioned and measured at a pre-determined place on the disk during testing. This pre-determined place is one or more positions with different head read-write properties and becomes the reference place for measurement. The pre-determined place is, for instance, near the inner periphery of the disk, near the outer periphery of the disk, and so forth. Positioning at such a pre-determined place is called static positioning. Static positioning requires a wide positioning range of several 10 mm or more, but high speed is not required. Moreover, there are cases even during actual measurements where the head is finely relatively positioned. For instance, by means of track profile measurements, magnetic signals are written at a pre-determined place on a disk and then, the intensity of the magnetic signals that have been written is measured while continuously positioning in very small intervals close to the pre-determined place in order to measure the intensity distribution of these magnetic signals. This type of positioning during measurements is called dynamic positioning. Dynamic positioning requires high speed, but the necessary positioning range is 1 μm or less.

There are several types of head positioning apparatuses depending on the positioning system that is used. The X-Y system and the X-θ system are likely to be used in the positioning apparatuses.

Conventional X-Y positioning apparatuses comprise an XY stage and a piezo stage (for instance, JP (Kohyo) 2003-515,859 (page 7, FIG. 1)). The XY stage is an apparatus for linear positioning of a head in two orthogonal directions. The piezo stage is an apparatus for linear positioning of a head in a single direction. Static positioning is performed by the XY stage. Moreover, dynamic positioning is performed by the piezo stage.

In addition, a conventional X-θ positioning apparatus comprises an X stage and a rotary positioner (for instance, JP (Kokai) 2000-187,821 (FIG. 1)). The X stage is an apparatus for linear positioning of a head in a single direction. The rotary positioner is an apparatus for rotational positioning of a head. Static positioning is performed by the X stage and the rotary positioner. A means for moving the head in a total of three directions, the X direction and the Y direction of the XY stage and one direction of the piezo stage, is needed with the X-Y positioning apparatus. On the other hand, X-θ positioning apparatuses should have a means for moving the head in a total of two directions, the X direction of the X stage and the direction of rotation of the rotary positioner. Consequently, the X-θ positioning apparatus is characterized in that a means for movement of the head in one direction can be omitted and therefore, its physical size is small and apparatus cost is inexpensive when compared to the XY positioning apparatus.

However, the X-θ positioning apparatus has a disadvantage in that positioning speed is slow. The reason for this is explained below. The X stage and the rotary positioner of a conventional X-θ positioning apparatus are controlled by a PC. This is because controlling the X stage and the rotary positioner requires multiple complex processes. For instance, static positioning is performed by the X stage and the rotary positioner. An operation whereby coordinates (radius r, skew angle φ) designated by the user are converted to coordinates (x, θ) appropriate for control of the X stage and the rotary positioner before actual positioning is necessary with this static positioning. Moreover, by means of static positioning, the movement path of the head is found before actual positioning so that the moving head does not collide with obstructions. Furthermore, the X stage and the rotary positioner also perform head loading/unloading, and so forth. As previously mentioned, multiple complex processes are necessary for the X stage and the rotary positioner. When these processes are executed by a low-level processor such as a digital signal processor (DSP), or are fully hardware-implemented, the equipment structure and programs become complicated. Complex equipment structure and programs invite an increase in development manpower and development time. There has been considerable progress in technology in the hard disk drive field in recent years and there is an urgent market demand for excellent head/disk testing apparatuses. Moreover, there is a strong demand for a reduction in the cost of head/disk testing apparatuses in order to reduce the manufacturing cost of hard disk drives. In order to respond to the above-mentioned market demands, the X stage and the rotary positioner of the X-θ positioning apparatus are controlled using a PC with an ordinary OS loaded. However, this type of PC lacks real-time processing capability, such as frequent interruption of the OS. Dynamic positioning by the rotary positioner is limited by the PC processing capability and impedes high speed.

In addition to the above-mentioned demands, there has been a need for curtailment of testing time and reduction of equipment space for head/disk testing apparatuses in recent years. However, head/disk testing apparatuses comprising conventional positioning apparatuses cannot simultaneously satisfy these demands.

Therefore, the present invention uniquely provides a small-footprint positioning apparatus that is capable of high-speed positioning. Moreover, the present invention also provides a controlling apparatus for controlling this positioning apparatus.

SUMMARY OF THE INVENTION

A positioning apparatus characterized in that a positioning apparatus for the relative positioning of a head and a disk comprising: a processor for generating a positioning command that generates a first positioning command from a second positioning command and a third positioning command; and an apparatus for moving the head or disk based on the first positioning command.

The processor which generates a positioning command comprises an adder that adds the second positioning command and the third positioning command to generate this first positioning command.

The processor further comprises memory, wherein a pre-established positioning command is stored in the memory and read to become the second positioning command and the second positioning command is added to the third positioning command.

The processor further comprises a counter, wherein the output of the counter becomes the second positioning command and the second positioning command is added to the third positioning command.

The third positioning command is multiplied and input to the adder.

Either the second positioning command or the third positioning command or both change in synchronization with the rotation of the disk.

The apparatus for moving the head or the disk is a rotational movement apparatus.

A testing apparatus for inspecting at least one of a head and a disk, comprising a positioning apparatus for the relative positioning of a head and a disk, the positioning apparatus comprising: a processor for generating a first positioning command from a second positioning command and a third positioning command; and an apparatus for moving the head or the disk based on the first positioning command. The second positioning command is a command relating to the dynamic positioning of the head or the disk, and wherein the third positioning command is a command relating to the static positioning of the head or the disk.

A controlling apparatus for controlling a positioning apparatus that relatively positions a head and a disk, the positioning apparatus comprising: a linear positioning apparatus; a rotational positioning apparatus; a first processor for generating a first command relating to the dynamic positioning of the head or the disk in order to control the rotational positioning apparatus; and a second processor for generating a second command relating to the static positioning of the head or the disk in order to control the rotational positioning apparatus; wherein the first and second processors may be the same or different processors. The first command is a command representing $\sin^{-1}\{dr/(L\cdot\cos\phi)\}$ or $\{dr/(L\cdot\cos\phi)\}$ wherein the desired movement distance of the head is dr, the skew angle of the head is $\phi$, and the distance between the center of rotation of the rotational positioning apparatus and the head is L.

DETAILED DESCRIPTION OF THE PREFERRED EMBODIMENT

The rotational positioning apparatus is a rotational positioning apparatus for positioning of a head relative to a disk that comprises a means for moving this head or disk and that is capable of both static positioning and dynamic positioning, and further comprises a means for generating one positioning command to be input to the movement means from two positioning commands. Therefore, static positioning and dynamic positioning can be individually controlled by the movement means. Static positioning and dynamic positioning can be individually controlled and therefore, control of the dynamic positioning can be hardware-implemented, or it can be accomplished with a low-level processing means with which real-time processing is possible, such as a DSP. As a result, dynamic positioning can be high speed.

The present invention will be discussed based on preferred embodiments shown in the attached drawings. The first embodiment of the present invention is a head/disk testing apparatus and the general structure of this apparatus is shown in FIG. 1.

Figure 1:
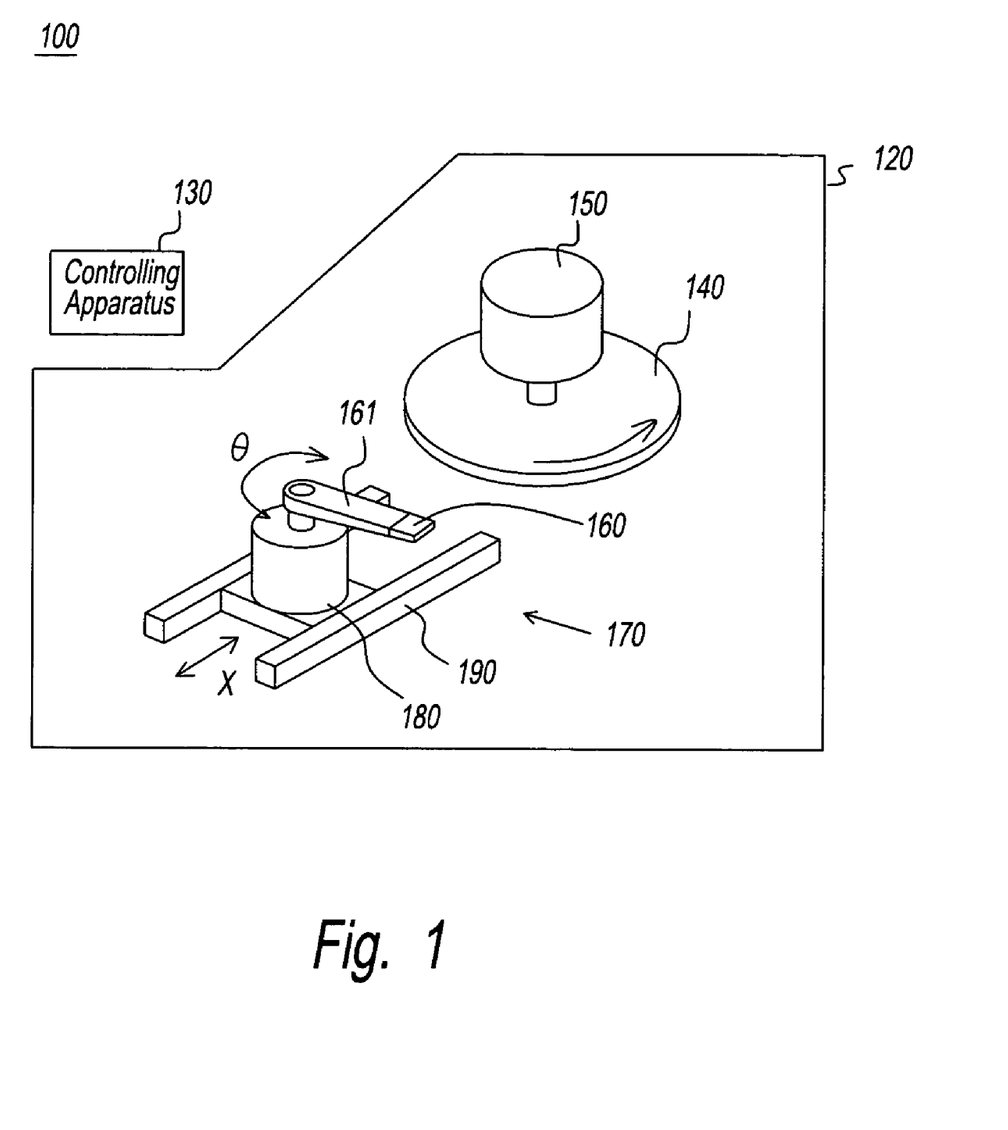
FIG. 1 is an oblique view showing head/disk testing apparatus 100.

A head/disk testing apparatus 100 in FIG. 1 comprises a spin stand 120 and a controlling apparatus 130 connected to spin stand 120. Spin stand 120 comprises a disk rotating apparatus 150, which holds and rotates a disk 140, and a rotational positioning apparatus 180 and a linear positioning apparatus 190, which position a head 160 relative to disk 140. In FIG. 1, disk rotating apparatus 150 rotates disk 140 counterclockwise, but it can also rotate disk 140 clockwise. Moreover, in FIG. 1, head 160 is loaded from underneath disk 140, but it can also be loaded from above. Rotational positioning apparatus 180 is an apparatus for the rotational positioning of an arm 161 supporting head 160 in direction $\theta$. Linear positioning apparatus 190 is the apparatus for the positioning of rotational positioning apparatus 180 in direction X. Linear positioning apparatus 190 virtually linearly positions arm 161 supporting head 160 in direction X. The coordinates on disk 140 designated by the user (radius r, skew angle $\phi$) are determined by position X of head 160, which is positioned by linear positioning apparatus 190, and position $\theta$ of head 160, which is positioned by rotational positioning apparatus 180.

Figure 2:
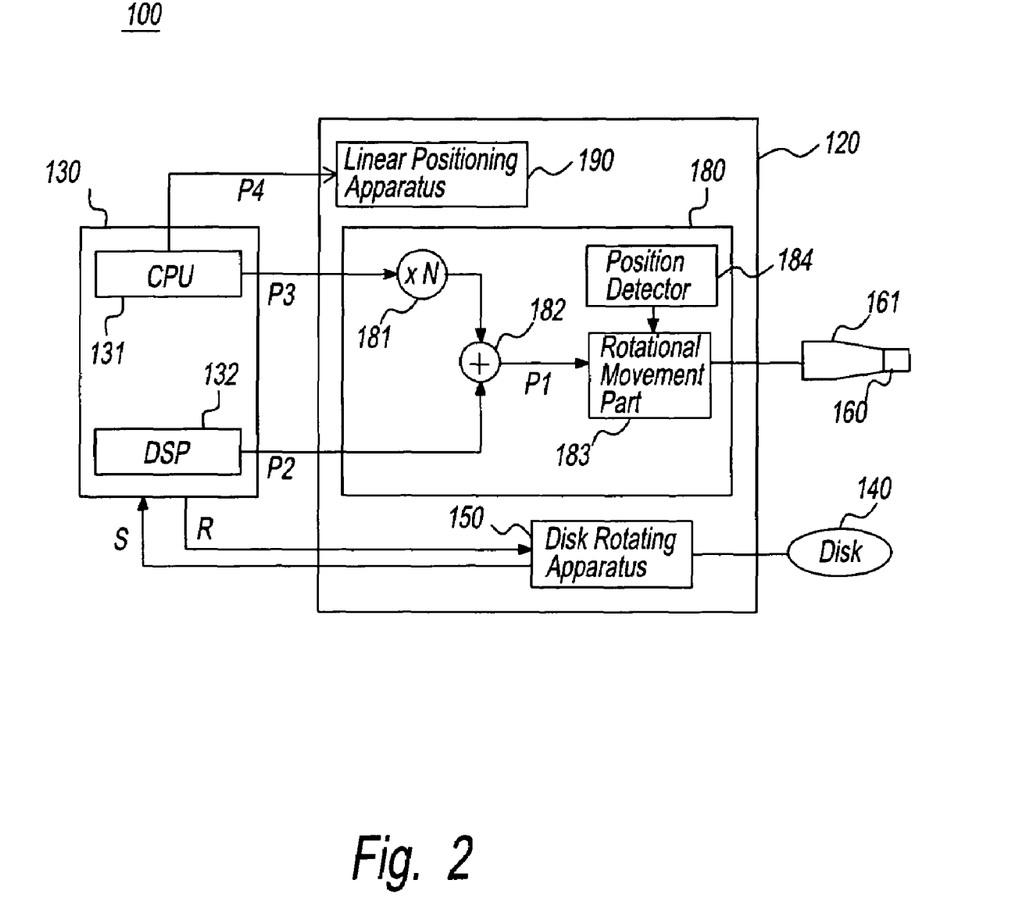
FIG. 2 is a block diagram showing head/disk testing apparatus 100.

A block diagram of the head/disk testing apparatus 100 will now be shown in FIG. 2.

Controlling apparatus 130 is an apparatus for controlling rotational positioning apparatus 180, linear positioning apparatus 190, and disk rotating apparatus 150 of spin stand 120. Controlling apparatus 130 comprises a CPU 131 and a DSP 132. CPU is the abbreviation for central processing unit. A positioning command P2 is a command for the dynamic positioning of head 160 and is generated by DSP 132 and used only for rotational positioning. DSP 132 can generate a positioning command P1 at a high speed independent from CPU 131. Here, the length of arm 161, that is, the distance from the center of rotation of rotational positioning apparatus 180 to head 160, is L. Moreover, the skew angle of head 160 is $\phi$. The angle of rotation $d\theta$ of rotational positioning apparatus 180 necessary for fine movement by dr of head 160 in the direction of the track at this time is $d\theta=\sin^{-1}\{dr/(L\cdot\cos\phi)\}$. [The value of] dr is very small and therefore, the angle of rotation $d\theta$ becomes $d\theta\cong\{dr/(L\cdot\cos\phi)\}$. Consequently, positioning command P2 is the command that represents $\sin^{-1}\{dr/(L\cdot\cos\phi)\}$ or $\{dr/(L\cdot\cos\phi)\}$. Positioning command P2 should be transmitted at high speed for high-speed control of rotational positioning apparatus 180. Thus, it is preferred that positioning command P2 is the command representing $\{dr/(L\cdot\cos\phi)\}$. Moreover, a positioning command P3 and a positioning command P4 are commands for the static positioning of head 160 and are generated by CPU 131. Positioning command P3 is used for rotational positioning. Positioning command P4 is used for linear positioning. Positioning command P3 and positioning command P4 are related to one another and are calculated from the coordinates (radius r, skew angle $\phi$) on disk 140 designated by the user. In addition, controlling apparatus 130 outputs rotation command R that designates the number of revolutions per unit time of disk 140. Rotation command R can be output from either CPU 131 or DSP 132, or it can be output from another apparatus.

Rotational positioning apparatus 180 receives positioning command P2 and positioning command P3 from controlling apparatus 130. Rotational positioning apparatus 180 comprises a multiplier 181, an adder 182, a rotational movement part 183, and a position detector 184. Multiplier 181 is the apparatus for multiplying positioning command P3 by N and outputting this to adder 182. N is any number. Adder 182 adds positioning command P2 and positioning command P3 that has been multiplied by N by multiplier 181 and outputs this to rotational movement part 183. The output command of adder 182 is positioning command P1. The device under test is head 160 held by arm 161. Position detecting part 184 detects the position or amount of rotation of rotational movement part 183. Rotational movement part 183 moves the device under test to the place designated by positioning command P1 while referring to the results detected by position detecting part 184.

Linear positioning apparatus 190 receives positioning command P4 from controlling apparatus 130. Linear positioning apparatus 190 moves the device under test to the place designated by the positioning command P4.

Disk rotating apparatus 150 receives rotation command R from controlling apparatus 130. Disk rotating apparatus 150 rotates disk 140 by the number of revolutions per unit time specified by rotation command R. Moreover, disk rotating apparatus 150 outputs a period signal S synchronized with the rotation of disk 140. For instance, period signal S is an index signal, sector signal, and so forth.

As previously described, the positioning apparatus comprises a means for generating a first positioning command P1 to be input to rotational movement part 183 from positioning command P2 and positioning command P3. Therefore, controlling apparatus 130 is capable of individually controlling both static positioning and dynamic positioning by rotational movement part 183. Thus, a control system optimal for dynamic positioning can be made. By means of the present embodiment, controlling apparatus 130 comprises inexpensive DSP 132 capable of executing simple operations at a high speed as a special processor for the dynamic positioning.

Figure 3:
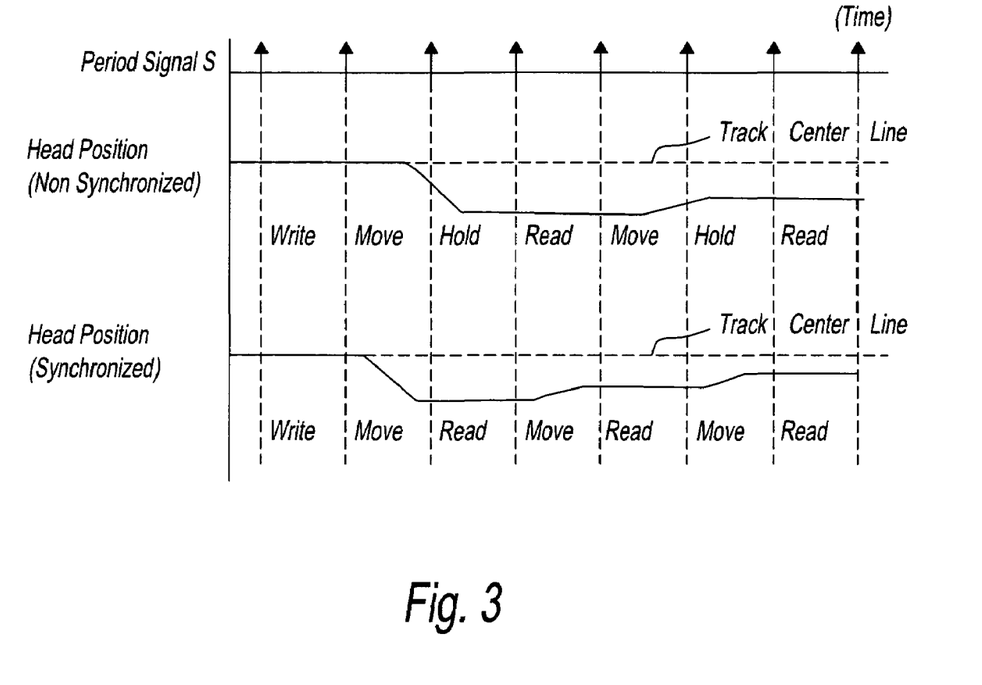
FIG. 3 is a drawing showing the relative position of head 160 and the status of head/disk testing apparatus 100.

Moreover, controlling apparatus 130 receives period signals S output from disk rotating apparatus 150. Head/disk testing apparatus 100 performs the relative positioning of head 160 in synchronization with this period signal S and curtails the real time needed for positioning. The details will be described while referring to FIG. 3. FIG. 3 is a drawing showing the position of head 160 and the status of head/disk testing apparatus 100 during the measurement of a certain measurement item. The head position in FIG. 3 is a graph showing the relative position of the head on a track on the disk. Head/disk testing apparatus 100 measures the properties of head 160 and disk 140 by reading data relating to the track and sector on disk 140. It is necessary to start at the beginning of a track or a sector when reading data on this track or sector. There are cases where the beginning of a track or sector is passed over during positioning when head 160 is relatively positioned without regard for the beginning of the track or sector. Head/disk testing apparatus 100 will not start the measurement until it reaches the beginning of the next track or sector and useless wait time is produced as a result (refer to head position (non-synchronized) in FIG. 3). If head/disk testing apparatus 100 is adapted to the relative positioning of head 160 in synchronization with period signal S, generation of the above-mentioned useless wait time can be controlled. Moreover, if the time needed for the relative positioning of head 160 is curtailed so that it falls within the period during which the start of the track or sector emerges, none of the above-mentioned useless wait time will occur (refer to head position (synchronized) in FIG. 3). Relative positioning in synchronization with period signal S is realized by changing positioning command P2 in synchronization with period signal S.

Dynamic positioning performs successive positioning at multiple pre-determined positions. Consequently, the control of dynamic positioning can further be hardware-implemented. A second embodiment that has been adapted to the hardware-implemented control of dynamic positioning is described below.

Figure 4:
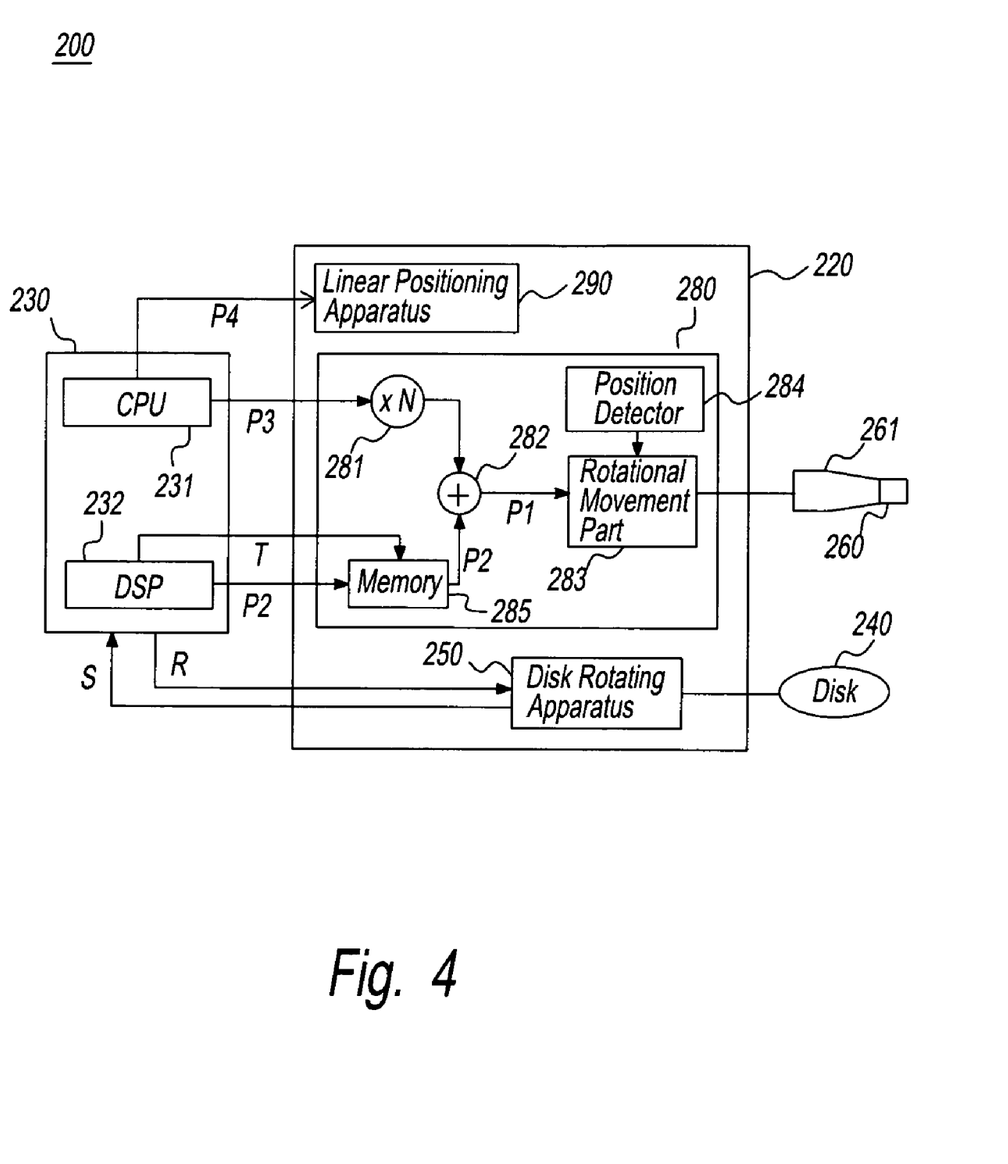
FIG. 4 is a block diagram showing head/disk testing apparatus 200.

The second embodiment of the present invention is a head/disk testing apparatus and a block diagram of this is shown in FIG. 4. A head/disk testing apparatus 200 in FIG. 4 comprises a spin stand 220 and a controlling apparatus 230. Spin stand 220 comprises a disk rotating apparatus 250, which holds and rotates disk 240, and a rotational positioning apparatus 280 and a linear positioning apparatus 290, which position a head 260 relative to disk 240. A rotational positioning apparatus 280 is an apparatus for the rotational positioning of an arm 261 that holds head 260. A linear positioning apparatus 290 is an apparatus for the linear positioning of apparatus 280. Linear positioning apparatus 290 virtually linearly positions arm 261 that holds head 260. The coordinates (radius r, skew angle $\phi$) on disk 240 designated by the user are determined by position X of head 260, which is positioned by linear positioning apparatus 290, and position $\theta$ of head 260, which is positioned by rotational positioning apparatus 280.

Controlling apparatus 230 is an apparatus that controls rotational positioning apparatus 280, linear positioning apparatus 290, and disk rotating apparatus 250 of spin stand 220. Controlling apparatus 230 comprises a CPU 231 and a DSP 232. Positioning command P2 is the command for the dynamic positioning of head 260 and is generated by DSP 232 and used for rotational positioning only. DSP 232 generates positioning command P2 at a high speed independent of CPU 231. Here, the length of arm 261, that is, the distance from the center of rotation of rotational positioning apparatus 280 to head 260, is L. Moreover, the skew angle of head 260 is $\phi$. The angle of rotation d$\theta$ of rotational positioning apparatus 280 necessary for fine movement by dr of head 260 in the track direction at this time is d$\theta$=sin$^{-1}$\{dr/(L·cos $\phi$)\}. [The value of] dr is very small and therefore, the angle of rotation d$\theta$ becomes d$\theta \cong$\{dr/(L·cos $\phi$)\}. Positioning command P2 should be transmitted at high speed for the high-speed control of rotational positioning apparatus 280. Thus, it is preferred that positioning command P2 is the command representing \{dr/(L·cos $\phi$)\}. Moreover, positioning command P3 and positioning command P4 are commands for the static positioning of head 260 and are generated by CPU 231. Positioning command P3 is used for rotational positioning. Positioning command P4 is used for linear positioning. Positioning command P3 and positioning command P4 are related to one another and are calculated from coordinates (radius r, skew angle $\phi$) on disk 240 designated by the user. In addition, rotation command R that designates the number of revolutions per unit time of CPU 231 and disk 240 is output. Rotation command R can be output from either CPU 131 or DSP 132, or it can be output from another apparatus.

Rotational positioning apparatus 280 receives positioning command P2 and positioning command P3 from controlling apparatus 230. Rotational positioning apparatus 280 comprises a multiplier 281, an adder 282, a rotational movement part 283, a position detector 284, and a memory 285. Multiplier 281 is the apparatus that multiplies positioning command P3 by N and outputs this to adder 282. Memory 285 is the apparatus for storing positioning command P2 and outputting pre-stored positioning command P2 in response to a trigger signal T output from controlling apparatus 230. Adder 282 adds positioning command P2 output by memory 285 and positioning command P3 multiplied by N by multiplier 281 and outputs this command to rotational movement part 283. The output command of adder 282 becomes positioning command P1. The device under test is head 260 held by arm 261. Position detector 284 detects the position or the amounts of rotation of rotational movement part 283. Rotational movement part 283 moves the device under test to the place designated by positioning command P1 while referring to the results detected by position detector 284.

Linear positioning apparatus 290 receives positioning command P4 from controlling apparatus 230. Linear positioning apparatus 290 moves the device under test to the place designated by positioning command P4.

Disk rotating apparatus 250 receives rotation command R from controlling apparatus 230. Disk rotating apparatus 250 rotates disk 240 by the number of revolutions per unit time designated by rotation command R. Moreover, disk rotating apparatus 250 outputs a period signal S synchronized with the rotation of disk 240. For instance, period signal S is an index signal, sector signal, and so forth.

As described above, the positioning apparatus further comprises a means for generating one positioning command P1 that is input to rotational movement part 283 from positioning command P2 and positioning command P3, and therefore, controlling apparatus 230 is capable of individually controlling both static positioning and dynamic positioning by rotational movement part 283. Thus, a control system optimal for dynamic positioning can be made. By means of the present embodiment, rotational positioning apparatus 280 further comprises memory 285 and is adapted such that positioning command P2 is output from the memory 285 during actual dynamic positioning. DSP 232 should transmit a trigger signal T during actual dynamic positioning. Memory 285 can be adapted such that one positioning command P2 is output for one trigger signal T, or it can be adapted such that positioning commands P2 are output in succession and continuously at a pre-determined time intervals for one trigger signal T. In either case, dynamic positioning is hardware-implemented and therefore is very high speed. It should be noted that as long as CPU 231 has sufficient capacity, it can also transmit trigger signals T.

Moreover, controlling apparatus 230 receives period signals S output from disk rotating apparatus 250. Head/disk testing apparatus 200 relatively positions head 260 in synchronization with this period signal S and curtails the real time needed for positioning. The details are the same as those for controlling apparatus 130 of the first embodiment. It should be noted that the relative positioning in synchronization with period signal S is realized by changing trigger signal T in synchronization with period signal S. Moreover, memory 285 also operates in synchronization with trigger signal T when memory 285 is positioned in succession and continuously at a pre-determined time interval with respect to one trigger signal T.

Next, a third embodiment adapted for hardware-implemented control of dynamic positioning is described below.

Figure 5:
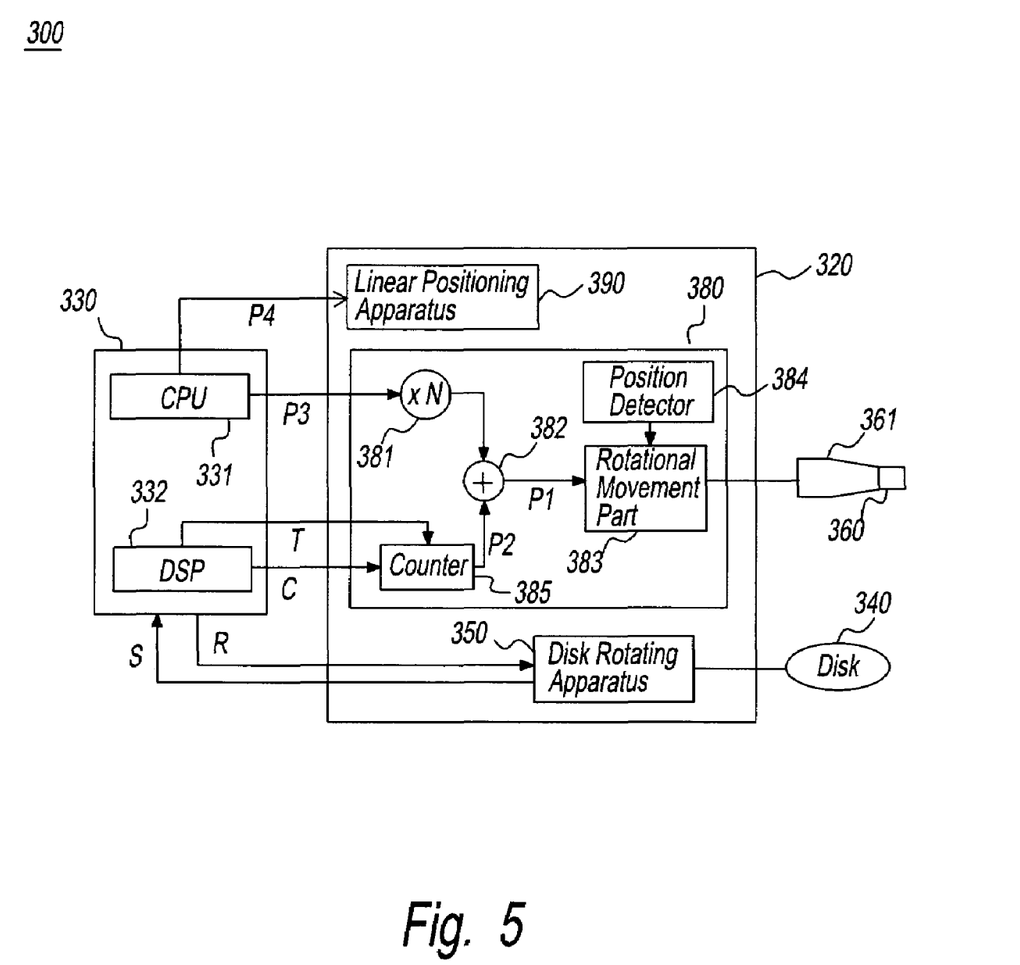
FIG. 5 is a block diagram showing head/disk testing apparatus 300.

A third embodiment of the present invention is a head/disk testing apparatus and a block diagram of this is shown in FIG. 5. In FIG. 5, a head/disk testing apparatus 300 comprises a spin stand 320 and a controlling apparatus 330. Spin stand 320 comprises a disk rotating apparatus 350, which holds and rotates a disk 340, and a rotational positioning apparatus 380 and a linear positioning apparatus 390, which position a head 360 relative to disk 340. Rotational positioning apparatus 380 is an apparatus that rotates and positions an arm 361 holding head 360. Linear positioning apparatus 390 is an apparatus that linearly positions rotational positioning apparatus 380. Linear positioning apparatus 390 virtually linearly positions arm 361 that holds head 360. The coordinates (radius r, skew angle φ) on disk 340 designated by the user are determined from position X of head 360, which is positioned by linear positioning apparatus 390, and position θ of head 360, which is positioned by rotational positioning apparatus 380.

Controlling apparatus 330 is an apparatus that controls rotational positioning apparatus 380, linear positioning apparatus 390, and disk rotating apparatus 350 of spin stand 320. Controlling apparatus 330 comprises a CPU 331 and a DSP 332. A count command C is the command for generating position P2 for the dynamic positioning of head 360 and is generated by DSP 332. Here, the length of arm 361, that is, the distance from the center of rotation of rotational positioning apparatus 380 to head 360, is L. Moreover, the skew angle of head 360 is φ. The angle of rotation dθ of rotational positioning apparatus 380 necessary for fine movements of head 360 by dr in the direction of the track at this time is $d\theta=\sin^{-1}\{dr/(L \cdot \cos \phi)\}$. The value of dr is very small and therefore, the angle of rotation dθ becomes $d\theta \approx \{dr/(L \cdot \cos \phi)\}$. In the end, dθ is a primary function of dr and therefore, positioning command P2 can be generated by a counter 385. High-speed operation in comparison to DSP 332 can be expected with counter 385 because of the use of a counter, and so forth. Positioning command P3 and positioning command P4 are commands for the static positioning of head 260 and are generated by CPU 331. Positioning command P3 is used for the rotational positioning. Positioning command P4 is used for the linear positioning. Positioning command P3 and positioning command P4 are related to one another and are computed from the coordinates (radius r, skew angle φ) on disk 340 designated by the user. Moreover, CPU 331 outputs a rotation command R designating the number of revolutions per unit time of disk 340. Rotation command R can be output from either DSP 322, or it can be output from another apparatus.

Rotational positioning apparatus 380 receives count command C and positioning command P3 from controlling apparatus 330. Rotational positioning apparatus 380 comprises a multiplier 381, an adder 382, a rotational movement part 383, a position detector 384, and counter 385. Multiplier 381 is the apparatus that multiplies positioning command P3 by N and outputs this to adder 382. Counter 385 outputs positioning command P2 based on count command C in response to a trigger signal T output from controlling apparatus 330. Count command C includes at least one of the starting value or ending value of the count, or the counter interval. Adder 382 adds positioning command P2 output by counter 385 and positioning command P3 multiplied by N by multiplier 381 and outputs this to rotational movement part 383. The output command of adder 382 becomes positioning command P1. The device under test is head 360 held by arm 361. Position detector 384 detects the position or the amounts of rotation of rotational movement part 383. Rotational movement part 383 moves the device under test to the place designated by positioning command P1 while referring to the results detected by position detector 384.

Linear positioning apparatus 390 receives positioning command P4 from controlling apparatus 330. Linear positioning apparatus 390 moves the device under test to a place designated by positioning command P4.

Disk rotating apparatus 350 receives a rotation command R from controlling apparatus 330. Disk rotating apparatus 350 turns disk 340 by the number of revolutions per unit time designated by rotation command R. Moreover, disk rotating apparatus 350 outputs a period signal S synchronized with the rotation of disk 340. For instance, period signal S is an index signal, sector signal, and so forth.

As described above, the positioning apparatus also comprises a means for generating one positioning command P1 that is input to rotational movement part 383 from positioning command P2 and positioning command P3, and therefore, controlling apparatus 330 can individually control both static positioning and dynamic positioning by rotational movement part 383. Thus, a control system optimal for dynamic positioning can be made. By means of the present embodiment, rotational positioning apparatus 280 further comprises counter 385 and is adapted such that positioning command P2 is output from the counter 385 during actual dynamic positioning. DSP 232 should transmit a trigger signal T during actual dynamic positioning. Counter 385 can also be adapted such that one positioning command P2 is output for one trigger signal T, or it can be adapted such that positioning commands P2 are output in succession and continuously at pre-determined time intervals for one trigger signal T. In either case, dynamic positioning is hardware-implemented and therefore is very high-speed. It should be noted that as long as CPU 331 has sufficient capacity, it can also transmit count commands C and trigger signals T.

Moreover, controlling apparatus 330 receives period signals S output from disk rotating apparatus 350. Head/disk testing apparatus 300 relatively positions head 360 in synchronization with this period signal S and curtails the real time needed for positioning. The details are the same as for controlling apparatus 130 of the first embodiment. It should be noted that the relative positioning in synchronization with period signal S is realized by changing trigger signal T in synchronization with period signal S. Moreover, counter 385 also operates in synchronization with trigger signal T when counter 385 is positioned in succession and continuously at a pre-determined time interval with respect to one trigger signal T.

Figure 6:
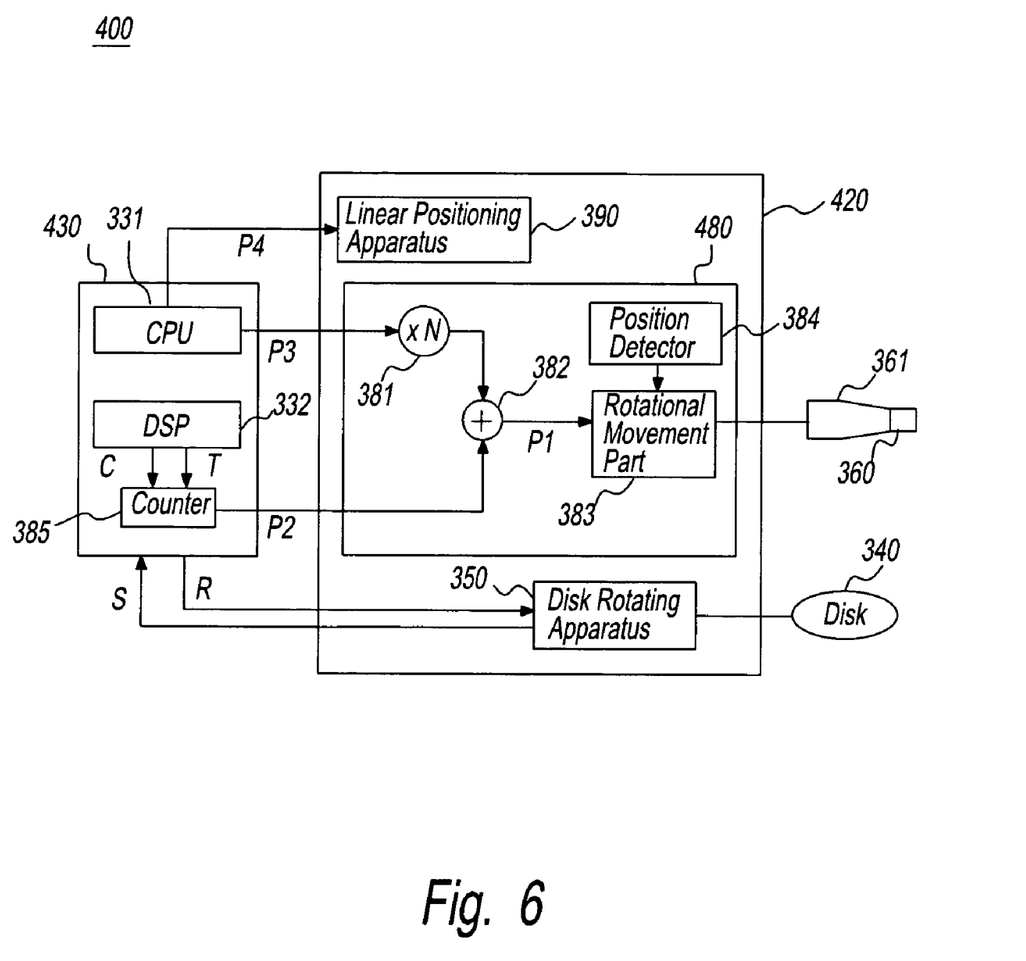
FIG. 6 is a block diagram showing head/disk testing apparatus 400.

The head/disk testing apparatus in FIG. 5 can be adapted so that controlling apparatus 330 comprises counter 385 of rotational positioning apparatus 380. Such a disk testing apparatus is shown in FIG. 6. A disk testing apparatus 400 in FIG. 6 comprises a spin stand 420 and a controlling apparatus 430. Spin stand 420 comprises linear positioning apparatus 390, disk rotating apparatus 350, and a rotational positioning apparatus 480. Rotational positioning apparatus 480 is rotational positioning apparatus 380 shown in Figuring 5 minus counter 385. Moreover, controlling apparatus 430 is controlling apparatus 330 shown in FIG. 5 also comprising counter 385. The other structural elements shown in FIG. 6 are the same as the elements with the same reference number in FIG. 5. The detailed description is the same as previously given.

The present invention is a technology that is useful for a positioning apparatus with which two different positioning operations are possible with one positioning apparatus. Consequently, the results of the present invention are similarly produced even if, in the above-mentioned embodiments, the positioning apparatus comprises a linear movement means such as a piezo actuator with which both dynamic positioning and static positioning are possible in place of a rotational movement part.

Moreover, the results of the present invention are similarly produced even if the above-mentioned embodiments do not have a multiplier and are adapted so that positioning command P3 is directly input to the adder.

Furthermore, the rotational positioning apparatus of the above-mentioned embodiments can also include a position memory means in which the current position is stored so that when the rotational movement means rotates and moves in response to the number of input pulses, positioning command P1 and the contents of the position memory means are compared and a pulse indicating the difference is output.

What is claimed is:

1. A positioning apparatus for the relative positioning of a head and a disk comprising:
   a processor for generating a first positioning command from a second positioning command relating to the dynamic positioning of said head or said disk and a third positioning command relating to the static positioning of said head or said disk; and
   an apparatus for moving said head or said disk based on said first positioning command,
   wherein said processor comprises an adder that adds said second positioning command and said third positioning command to generate said first positioning command, and
   wherein said processor further comprises memory, wherein a pre-established positioning command is stored in said memory and read to become said second positioning command and said second positioning command is added to said third positioning command.

2. A positioning apparatus for the relative positioning of a head and a disk comprising:
   a processor for generating a first positioning command from a second positioning command relating to the dynamic positioning of said head or said disk and a third positioning command relating to the static positioning of said head or said disk; and
   an apparatus for moving said head or said disk based on said first positioning command,
   wherein said processor comprises an adder that adds said second positioning command and said third positioning command to generate said first positioning command, and
   wherein said processor further comprises a counter, wherein the output of said counter becomes said second positioning command and said second positioning command is added to said third positioning command.

3. A positioning apparatus for the relative positioning of a head and a disk comprising:
   a processor for generating a first positioning command from a second positioning command relating to the dynamic positioning of said head or said disk and a third positioning command relating to the static positioning of said head or said disk; and
   an apparatus for moving said head or said disk based on said first positioning command,
   wherein said processor comprises an adder that adds said second positioning command and said third positioning command to generate said first positioning command, and
   wherein said third positioning command is multiplied and input to said adder.

4. A controlling apparatus for controlling a positioning apparatus that relatively positions a head and a disk, said positioning apparatus including a linear positioning apparatus and a rotational positioning apparatus, said controlling apparatus comprising:
- a first processor for generating a first command relating to the dynamic positioning of said head or said disk in order to control said rotational positioning apparatus; and
- a second processor for generating a second command relating to the static positioning of said head or said disk in order to control said linear positioning apparatus, wherein said first and second processors may be the same or different processors.

5. The controlling apparatus according to claim 4, said first command is a command representing $\sin^{-1}\{dr/(L\cdot\cos\phi)\}$ or $\{dr/(L\cdot\cos\phi)\}$ wherein the desired movement distance of said head is dr, the skew angle of said head is $\phi$, and the distance between the center of rotation of said rotational positioning apparatus and said head is L.

* * * * *